Patented May 15, 1923.

1,454,873

UNITED STATES PATENT OFFICE.

HENRY C. P. WEBER, OF PITTSBURGH, PENNSYLVANIA, ASSIGNOR TO WESTINGHOUSE ELECTRIC & MANUFACTURING COMPANY, A CORPORATION OF PENNSYLVANIA.

METHOD OF HANDLING GASES AND PRODUCT CONTAINING DISSOLVED GAS.

No Drawing. Application filed May 23, 1919, Serial No. 299,302. Renewed December 8, 1920. Serial No. 429,250.

*To all whom it may concern:*

Be it known that I, HENRY C. P. WEBER, a citizen of the United States, and a resident of Pittsburgh, in the county of Allegheny and State of Pennsylvania, have invented a new and useful Improvement in Methods of Handling Gases and Product Containing Dissolved Gas, of which the following is a specification.

My invention relates to a method of handling gases and more particularly to a method of preparing gases for convenient storage and shipment. The primary object of my invention consists in providing a means for treating a gas, such as chlorine, phosgene or the like, so as to prepare it for convenient storage and shipment and in such manner that it may be conveniently employed for various purposes, as desired.

Heretofore, to the best of my knowledge, gases of this character have been stored, under high pressure, in strong, heavy containers. This method of storing and transporting gases is expensive and, in many other respects, unsatisfactory. The object of my present invention is to overcome these difficulties by dissolving the chlorine, or other gas, in a suitable solvent, not readily affected by the gas but capable of dissolving it in large quantities.

In practising my invention, for example, I may pass a gas, such as chlorine, into any suitable solvent, such as carbon tetrachloride until no further amount of chlorine can be taken up by the solvent. If the chlorine is passed into the liquid under normal pressures, at least twenty-five to thirty times its own volume of the gas will be absorbed. Obviously, the total quantity of chlorine taken up will depend upon the pressure at which the solution is saturated and may, consequently, be varied if desired.

While I have mentioned carbon tetrachloride as an example and have found it very efficient because of its unusual capacity for dissolving chlorine, it will be appreciated that numerous other solvents may be utilized for this purpose. In fact, any solvent not readily affected by the chlorine or other gas is suitable for the purpose. Examples of such solvents are the numerous well known chlorinated hydrocarbons, such as the chlorinated methanes, ethanes, di-, tri- and tetrachlorethanes, di-, tri- and tetrachlorinated ethylene, similar butane compounds and liquid chlorinated benzenes, as mono, di-, trichlorbenzenes, or mixtures of these. It will, therefore, be obvious that I do not wish to limit my invention to the use of any particular solvent as a vehicle for the gas to be handled.

It will, of course, be clear that a saturated solution of any gas, such as chlorine, may be readily and economically made and that the dissolved gas may be conveniently stored in suitable containers which need not be exceptionally strong unless the solution has been formed under super-atmospheric pressures. These containers may be readily shipped without any unusual care or precautions, and the dissolved gas will be readily available at any time.

The ease with which a gas, such as chlorine, in solution, may be handled and manipulated is the principal advantage of my invention, however, as the disagreeable effects of using gaseous chlorine are avoided, and unusual uniformity of results may be obtained. The chlorine may be used for disinfecting purposes, and also for step-wise chlorination in which the quantities of chlorine employed must be accurately controlled.

For example, a solution of chlorine, in a solvent, such as carbon tetrachloride, may be added, in theoretical amount, with or without dilution, to a solution of a substance to be chlorinated. The mixture may then be brought to the desired temperature to insure reaction, after which the reaction product may be removed or separated by the customary processes, such as crystallization, fractional distillation and the like. One of the chief advantages obtained by utilizing the chlorine in a solvent, as set forth by my invention, resides in the fact that catalyzers, such as iodine, sulphur, metal chlorides and the like, may be dissolved in proper amounts in the chlorine solution.

Although I have given chlorine and phosgene as examples of the gases to be treated and have mentioned carbon tetrachloride as the preferred solvent, it will be appreciated that my invention is not limited to any particular gas or solvent and that no restrictions are to be imposed upon my invention other than those indicated in the claims.

I claim as my invention:

1. The method of handling chlorine for easy manipulation in step-wise chlorination which comprises forming a solution, saturated at definite pressures, of the chlorine in a chlorinated hydrocarbon not readily affected by chlorine in which is dissolved a catalytic agent.

2. The method of handling chlorine for convenient manipulation in step-wise chlorination which comprises forming a solution of chlorine in carbon tetrachloride containing a dissolved catalytic agent.

3. A product for convenient shipment and storage comprising a saturated solution of chlorine in carbon tetrachloride containing a dissolved catalytic agent.

In testimony whereof, I have hereunto subscribed my name this 6th day of May, 1919.

HENRY C. P. WEBER.